Jan. 21, 1936.  L. M. E. CLAUSING ET AL  2,028,497
RADIO SIGNALING SYSTEM
Filed June 23, 1931
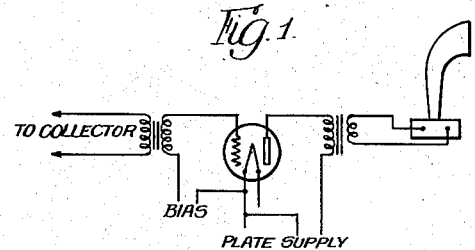
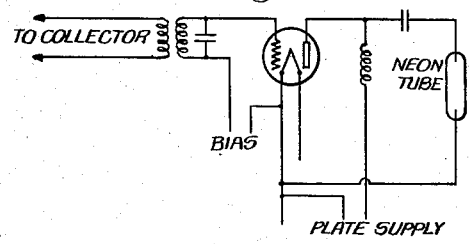
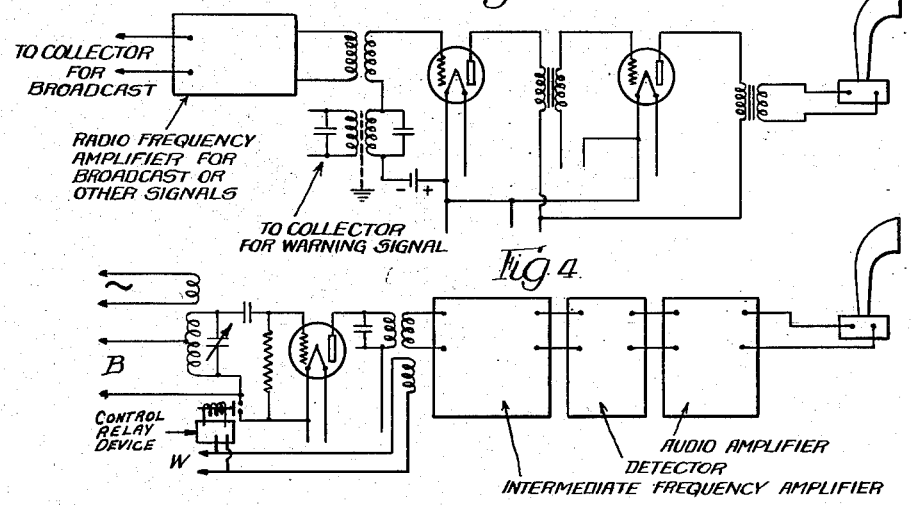
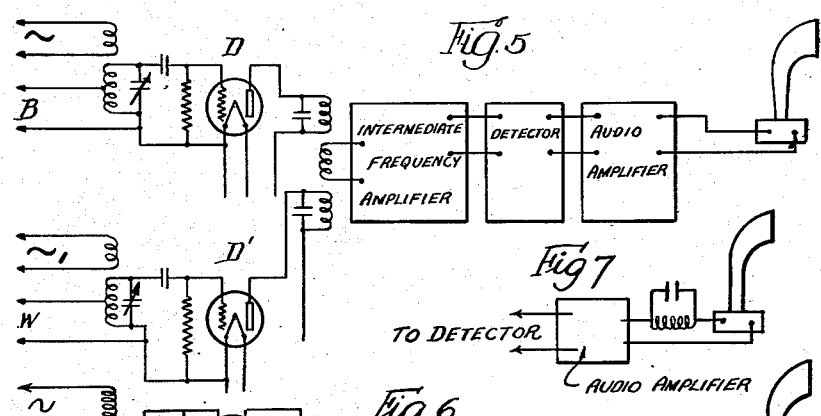
Inventors:
Joseph Edwin Smith, Jr.
Leroy M. E. Clausing,
By Richard Spencer, Atty.

Patented Jan. 21, 1936

2,028,497

UNITED STATES PATENT OFFICE 2,028,497

RADIO SIGNALING SYSTEM

Leroy M. E. Clausing, Chicago, Ill., and Joseph Edwin Smith, Jr., Gary, Ind.

Application June 23, 1931, Serial No. 546,302

12 Claims. (Cl. 250—2)

Our invention relates in general to signaling and has more particular reference to the transmission of warning impulses by radio, including means for receiving the impulses and applying the same in the operation of safety devices.

An important object of the invention is to provide means comprising radio apparatus and associated devices, operable to transmit warning signals or otherwise to prevent accidents such as collision between a vehicle and another object, such as another vehicle, more especially collisions at railroad crossings, and the invention may be applied to prevent collision between railroad and highway vehicles; to operate a primary protection device, such as an audible or visible signal, in highway vehicles in order to announce the proximity of a railroad crossing; to operate the brakes or other secondary protection devices of a vehicle automatically, when the same approaches a railroad crossing or other danger spot; to operate a warning signal or other primary protection device at the crossing upon the approach of a railroad vehicle; to operate a warning in a railroad vehicle as the same approaches a highway crossing or another railroad vehicle on the same track.

An important object of the invention is to mount a radio transmitter in position to be energized upon the approach of a railroad or other vehicle to a danger spot such as a railway crossing, and a receiver positioned to receive impulses from the transmitter and set in operation one or more devices designed to indicate a warning against and/or prevent the vehicle from coming into collision with other objects, as, for instance, another vehicle at said danger spot.

Another object is to mount the transmitter on the vehicle and mount the receiver at the place where collision is likely to occur and connect the same to operate safety devices, such as warning lights and the like, at such places.

Another object is to provide for setting the transmitter in the vehicle in operation as and when a vehicle approaches a position where collision is likely to occur.

Another important object is to provide a vehicle, which may be called a "warning vehicle", with means to cause transmission of a signal impulse as it approaches a position of danger where a collision or other accident is likely to occur and in providing means at a remote station for receiving the signal and relaying the same to actuate a device or devices adapted to indicate or otherwise make effective a warning so that the same may stimulate the initiation of accident preventing action either on the part of a human operator or by safety apparatus such as vehicle brakes. For example, where the receiver at the remote station is in an automobile or other highway vehicle, the signal may be audible or visible to the operator or may be additionally applied to operate the brakes of the vehicle immediately upon failure of the operator to take prompt action. The indicator may be located within sight or hearing of the operator so that it will not escape notice and where the system is used in automobiles in connection with warning against railroads, it will eliminate the danger occasioned by overlooking the present ineffective warning signals now being utilized.

Inasmuch as many automobiles are today equipped with radio receivers, an important object of our invention resides in utilizing such equipment for the reception of warning signals, and a further object is to cause the warning signal to be transmitted within the intermediate frequency band of super-heterodyne receivers so that the signal may be received in the intermediate frequency amplifier of a radio set and the loud speaker will serve as the warning indicator, with the signal coming in as interference. Again, if it should be undesirable to use the intermediate frequencies, the invention proposes the use of lower frequencies with direct amplification by special amplifiers, or the conversion of the received frequency, by a heterodyne converter, to one desired for amplification.

The invention may be applied to a railway system or the like to prevent collisions between trains, as well as between trains and automobiles. For example, all locomotives on a railway system may be equipped with transmitters for emitting signals on the same carrier frequency and with reception units for receiving signal warnings of such carrier frequency. In order that a locomotive will not receive its own warning signal or those coming from trains on other tracks, whose signals it will not be desired to receive, the invention proposes to modulate each transmitter with a different frequency. By so doing, the receivers can be equipped with a suitable filter or filters to eliminate the undesired signals.

Other objects and features of the invention will become apparent from a reading of the following specification in the light of the appended drawing, in which:

Figure 1 is a wiring diagram of a receiver adapted to be used in connection with the present invention;

Figure 2 is a view similar to Figure 1 showing the use of a visible signal indicator instead of an audible indicator;

Figure 3 is a diagram of a tuned, radio frequency amplification receiver having means included therein for detecting warning signals;

Figure 4 is a diagram of a super-heterodyne receiver equipped to receive signals at the intermediate frequency amplifier;

Figures 5 and 6 are diagrams of super-heterodyne receivers equipped with means to convert the frequency of the warning signal to a different frequency before amplification; and Figure 7 shows diagrammatically a part of a receiver provided with a simple form of filter adapted to eliminate, from the circuit, impulses having a certain frequency.

Referring to the drawing, the various figures therein show diagrammatically conventional types of radio reception units or circuits constructed for use in connection with the present invention. Since a variety of circuits may be employed with equal facility without departing from the basic scope of the invention, diagrammatic and schematic showings have been largely relied upon. To one skilled in the art, the construction and operation of the apparatus will be obvious after reading the following specification in the light of the drawing.

The warning signals may be of low radio frequency with transmitters of comparatively low power output or audio frequencies with somewhat greater power output. The transmitter may consist of a vacuum tube generator, or an alternating current dynamo if lower frequencies are to be used. The use of a tuned transmitter emitting a continuous wave of zero or low decrement is well suited for the purpose intended. Old styled, untuned transmitters (or coherers), for example, produce waves of high decrement which decay very rapidly and are therefore unsuited. Likewise, if coherers are used at the receiving end, as hereinafter described, a high power output is required at the broadcasting end, which requirement is avoided by applicants, who amplify the wave. For an antenna at the transmitting end, a suitable counterpoise or ground connections and an antenna may be employed. In the case of a railroad train, for instance, the trucks may be used with satisfactory results.

In the practice of the invention, a transmitter is preferably carried by the vehicle it is desired to warn against so that the warning signal may be dispatched when and as desired. It may, for example, be sent out automatically at regularly recurring intervals or only when the vehicle approaches a position where accidents are likely to occur and the modulating frequency may consist of audio warnings emitted by a siren, a phonographic device, or by word of mouth. On the other hand, the signal may, if it appears desirable, be modulated at frequencies above the audio range. Furthermore, it is within the confines of the invention to position the transmitter at a fixed point and have it operated by the approach of the warning vehicle. For example, the transmitter could be placed at a grade crossing to be activated by the approach of a train as by its whistle. Other installations of the transmitter are equally as effective.

The reception of audio frequency signals may be accomplished by means of a receiver, such as that shown in Figure 1, in which a collector, in the form of an antenna or loop, gathers the incoming wave and transmits it for amplification before it reaches the loud speaker, or other operable device for rendering the signal effective in accident prevention either by automatic means or by the intervention of a human operator. Figure 3 illustrates the use of a tuned radio frequency amplification receiver of a conventional type having, in combination therewith, means for receiving and applying the warning signal to the audio frequency stage thereof. As shown, in Figure 3 the conventional receiver circuit has added to it a warning signal collector, a transformer coupling the collector with the detector and a shield between the windings of the transformer for preventing reaction between the input and output of the radio frequency amplifier used for broadcast reception. When received, the signal is detected and amplified, one stage of amplification being shown, before passing on to the device for making the signal effective, which device is illustrated in the form of a loud speaker. The use of a conventional circuit of this particular type permits economical conversion into a system which, in addition to receiving the regular broadcast, will also receive the warning signals and will, after they pass through the detector circuit, superimpose them, in the form of interference, in the broadcast emitting from the loud speaker.

In Figure 2, there is disclosed a simple type of receiver for use in connection with frequencies above the audio frequency band. These may be within the radio frequency band or within the modulated zone lying between audio and radio frequencies. As therein illustrated, a neon light or other device, which is responsive at the frequencies employed and adapted to perform a desired protective function, as, for instance, the application of vehicle brakes or the operation of any device adapted to indicate, or otherwise make the reception of the signal effective in the prevention of a possible accident, is combined with an ordinary amplifier with suitable gain at the transmitted frequency. The use of a visible indicating device of the character shown is entirely suitable in certain installations, eliminates the use of a detector or rectifier and permits the receiver to be built economically.

We now come to the reception of signals of radio frequency and for this purpose, as shown in Figure 4, we may employ a conventional super-heterodyne receiver having means, in combination therewith, for receiving the incoming signals and directly amplifying them at the intermediate frequency stage. Today, the intermediate frequencies vary between 200 and 47 kc. and it will therefore be understood that radio manufacturers may have to adopt a standard frequency for the intermediate amplifier before the circuit shown in Figure 4 may be used generally for receiving warning signals. However, if railroads or vessels adopt this intermediate frequency system, radio manufacturers should be willing to standardize the intermediate amplification frequency. When this is accomplished, vehicles, such as automobiles, already equipped with radio sets of this conventional type may receive warning signals at slight cost; the cost of installing a collector at the intermediate frequency amplifier. Then also, the cost of transmission is low because of low power output.

It will be appreciated that super-heterodyne receivers, located within homes or places in the warning area where no warning is needed, have no collector for receiving signals at the intermediate frequency and therefore will not be affected.

Referring again to Figure 4, the symbol ~ represents the heterodyne frequency for converting signals received on the broadcast collector B to a frequency suitable for amplification by the intermediate frequency amplifier. The reference character, W, represents the collector for the warning signals of the intermediate frequency which pass to the intermediate frequency amplifier and thence on through the balance of the circuit, finally leaving the loud speaker in the form of interference. The collector W may be coupled to the intermediate frequency amplifier by means of a conductive, inductive, resistive, or capacitive coupling. By the use of suitable relays, solenoids, or by impressing a bias voltage on the broadcast receiving system, or by other convenient means, as indicated in Figure 4 of the drawing, the incoming warning signal may be utilized to interrupt or turn off the regular broadcast, in which event the warning signal may take the form of a broadcast instead of interference. Furthermore, the system may be such that after the intermediate frequency signal has been completed, the regular broadcast will automatically be resumed.

The above-described feature of utilizing intermediate frequencies for interposing one broadcast within another comprises an outstanding feature of the invention.

If the above-described method of receiving signals of intermediate frequencies in superheterodyne receivers is undesirable for certain purposes because, for example, radio manufacturers do not wish to standardize the intermediate frequency, or for the reason that the range cannot be properly limited, the other described types of apparatus may be employed, or the systems shown in Figures 5 and 6 may be used. As shown therein, the warning signal frequency is, by means of a heterodyne converter, changed to the frequency desired for amplification purposes. Thus, as illustrated, the symbol ∼ indicates the heterodyne frequency for converting the broadcast coming in over the collector B to the intermediate frequency, and, similarly, in Figure 5 the symbol ∼₁ represents the heterodyne frequency for converting the warning frequency coming over the collector W to the desired intermediate frequency whereby said heterodyne frequency may be applied to the receiver at the input of the intermediate frequency amplifier, while in Figure 6 the symbol ∼₁ represents the heterodyne frequency for converting the warning frequency coming over the collector W to the frequency of the impulses received by the collector B, whereby said heterodyne impulses may be applied to the receiver at the input of the detector D. The letters D and D' indicate, respectively, the detectors for broadcast and signal frequencies.

Upon reflection, it will be appreciated that various combinations of the described apparatus may be employed. For instance, if the shield between the windings of the transformer in Figure 3 is not satisfactory for preventing reaction between the input and output of the radio frequency amplifier used for broadcast reception and if other methods for balancing the input circuits of high gain amplifiers are not satisfactory, the warning signal in Figure 3 may be converted by means of a heterodyne frequency, as described above, in connection with Figure 5, and the new frequency can then be passed on to the collector frequency transformer.

If the warning vehicle is going to receive, as well as transmit, signals, it will be expedient to provide means for alternately connecting the transmitting apparatus and the reception unit with the antenna. This can be done by means of a commutator or other suitable switching device operating to detach the transmitter from the antenna, and immediately thereafter operating to attach the receiver and vice versa. This circuit changing operation may be repeated continuously. During the period when the transmitter is connected to the antenna, it may be in operation and an appreciable signal might be picked up by the receiver which is temporarily disconnected from the antenna. This signal preferably should be eliminated to avoid its possible interference with the reception of the incoming signal message and, to this end, a filter "Z", such as shown in Figure 7 may be employed. As shown in Figure 7, a tuned coil and a condenser are connected preferably in parallel with one another and in series in the circuit to eliminate signals of the frequency to which the filter is tuned.

It has already been pointed out that the invention may be employed to prevent collisions between trains, as well as between trains and vehicles. If this be done, the trains on a particular road or system will preferably carry transmitters modulated with different frequencies and the receivers on the trains will carry band pass filters or some other suitable apparatus for tuning out by elimination those modulated frequencies it is not desired to receive.

Furthermore, if the trains transmit signals of different modulations, the operator of an automobile in the vicinity will receive a signal of a different tone from each and, by knowing the number of trains nearby, can exercise the necessary degree of caution.

Although the present invention, in many of its aspects, is not restricted to transmitting warnings between vehicles, it is eminently suited to this purpose. For instance, in addition to producing a visible or audible signal in the warned vehicle, leaving the subsequent operation of the vehicle voluntary to the operator, suitable relays could be employed for automatically applying the brakes of the warned vehicle, thus making its operation involuntary. Then, also, the warning signal may be used for actuating the conventional grade crossing signals, or other devices for making the signal effective at the grade crossing in addition to making the signal effective in the warned vehicle as by actuating an audible or visual signal for attracting the attention of the operator of the vehicle or by automatically applying the brakes or by actuating other safety appliances without the intervention of the operator.

The invention may be used to warn autoists against the presence of schools; to signal between boats in fog; to notify a station of the approach of a train; to communicate signals between airplanes; or to perform numerous other signal communicating tasks. If the invention is used in connection with receiver sets now in use, the conversion of the latter will be comparatively simple, since the signal receiving system may be contained in a small unit placed in the receiving system. If the receiver is only for detecting the signal warnings and does not detect broadcasts, it may take the form of a reasonably priced, small, compact unit mounted in any convenient location in the vehicle. It has already been pointed out that the transmitter may be fixedly positioned, such as at a railroad crossing, and actuated by an approaching train.

It is to be understood and recognized that the invention may be employed in connection with radio transmission and reception apparatus of all kinds and that various applications and uses of the invention may be made by those skilled in the art without departing from the scope of the invention as outlined in the following claims.

Having thus described our invention, what we claim is new and desire to prove by United States Letters Patent, is:

1. For use in combination with a vehicle, a system comprising a radio receiver having means adjustable at will to condition the same to receive and sensibly detect radio oscillations of a selected frequency within a definite frequency range, a sensitive device operatively associated with said receiver and useful in the operation of the vehicle, and means to operate the sensitive device in response to the reception by the receiver of a radio oscillation of predetermined frequency outside of said frequency range regardless of the adjustment of the receiver.

2. For use in combination with a vehicle, a system comprising a radio receiver adjustable to selectively receive radio oscillations within a predetermined broadcast frequency range, said system including a sound reproducer adapted to be energized by the receiver in response to the reception of oscillations within the broadcast frequency range, said receiver also being simultaneously operable to receive, independently of the reception of the selected frequency oscillations, a radio oscillation of predetermined frequency outside of said broadcast frequency range, and to reproduce a corresponding effect useful in the operation of the vehicle regardless of the adjustment of the receiver.

3. The combination as set forth in claim 1, including a loud speaker adapted to reproduce as a sound sequence the oscillations selectively received and sensibly detected by the receiver.

4. The combination as set forth in claim 1, wherein the sensitive device comprises means adapted when operated to transmit a visual warning signal.

5. The combination as set forth in claim 1, wherein the sensitive device comprises a glow lamp.

6. The combination as set forth in claim 1, wherein the receiver comprises a super-heterodyne radio receiver adapted for the selective reception of radio oscillations within a variable frequency range, including means to collect and apply to the receiver, independently of but simultaneously with the selectively received oscillations, oscillations of a predetermined frequency.

7. The combination as set forth in claim 1, wherein the receiver comprises a super-heterodyne radio receiver adapted for the selective reception of radio oscillations within a variable frequency range, including means to collect and apply to the receiver oscillations of a predetermined frequency outside of the variable frequency range of the receiver.

8. In combination with a vehicle, a system comprising a radio receiver having means adjustable at will to condition the same to receive and sensibly detect radio oscillations of a selected frequency within a definite frequency range, a sensitive device operatively associated with said receiver and useful in the operation of the vehicle, and means to operate the sensitive device in response to the reception by the receiver of a radio oscillation of predetermined frequency outside of said frequency range regardless of the adjustment of the receiver, said receiver comprising a super-heterodyne radio receiver adapted for the selective reception of radio oscillations within a definite frequency range, including means to collect and apply to the receiver, independently of the selectively received oscillations, oscillations of a predetermined frequency whereby the collected oscillations of predetermined frequency may be superimposed upon the selected frequency oscillations and reproduce a warning in the form of recognizable interference.

9. For use in combination with a vehicle, a system comprising a radio receiver having means adjustable at will to selectively receive and detect radio oscillations within a definite frequency range, and means to simultaneously receive a wave of predetermined frequency outside of said range and to heterodyne and detect said wave and apply the resultant beat frequency to the receiver and means, useful in the operation of the vehicle, operably associated with said receiver and responsive to the application of the beat frequency on the receiver.

10. For use in combination with a vehicle, a system comprising a radio broadcast receiver having means adjustable at will to selectively receive a radio oscillation within an operating frequency range, and to heterodyne and apply the received oscillation to the receiver, a sensitive device useful in the operation of the vehicle and operatively associated with said receiver, means to receive an oscillation of predetermined frequency outside of the operating frequency range and to heterodyne said received oscillation of predetermined frequency in order to produce a modified vibration suitable for amplification by the receiver in any of the adjusted positions of the adjustable means and to apply the heterodyned oscillation to the receiver whereby to actuate said sensitive device.

11. For use in combination with a vehicle, a system comprising a radio broadcast receiver having means adjustable at will to selectively receive and detect radio oscillations of any frequency within a definite range and to reproduce the broadcast in the form of audible sounds, a sensitive device operatively associated with said receiver and useful in the operation of the vehicle, and means to operate the sensitive device in response to the reception of an oscillation of definite frequency outside of said definite range regardless of the adjustment of the adjustable means, including means to suspend the broadcast reproduction during the interval when said definite frequency oscillations are received.

12. In a signaling arrangement, the combination with a radio receiver carried in a vehicle and having adjustable means to receive transmissions over a predetermined frequency range, and means for audibly indicating the same, and warning means useful in the manual operation of the vehicle and operable in response to a transmission signal outside of said frequency range, said warning means comprising coupling devices for so impressing the energy of said transmission signal upon the circuits of said receiver that the latter audibly produces a signal through its indicating means simultaneously with that received over any portion of the predetermined frequency range.

LEROY M. E. CLAUSING.
JOSEPH EDWIN SMITH, Jr.